United States Patent [19]
Dicke

[11] Patent Number: 5,481,244
[45] Date of Patent: Jan. 2, 1996

[54] LOAD EXTENSION SIGNALING DEVICE

[75] Inventor: Grant D. Dicke, Downers Grove, Ill.

[73] Assignee: Dicke Tool Company, Downers Grove, Ill.

[21] Appl. No.: 154,170

[22] Filed: Nov. 17, 1993

[51] Int. Cl.⁶ .................................................. B60Q 7/00
[52] U.S. Cl. .......................... 340/473; 340/471; 340/431; 340/815.73; 116/173; 116/30; 116/28 R; 114/343
[58] Field of Search .............................. 340/473, 815.73, 340/471, 431; 116/30, 28 R, 173, 202; 114/343

[56] References Cited

U.S. PATENT DOCUMENTS

| | | | |
|---|---|---|---|
| 1,535,844 | 4/1925 | McLemore | 40/567 |
| 1,893,303 | 1/1933 | Philips | 248/207 |
| 2,975,401 | 3/1961 | Shupe | 340/84 |
| 3,041,580 | 6/1962 | Bos | 340/87 |
| 3,080,581 | 3/1963 | Smihal | 9/1 |
| 3,678,886 | 7/1972 | Tibbet | 116/28 R |
| 5,088,439 | 2/1992 | Anderson | 116/30 |
| 5,134,385 | 7/1992 | Coleman | 340/473 |

OTHER PUBLICATIONS

"Pyralite® Warning and Emergency Lights," 1 page brochure, Work Area Protection Corporation, A division of Stabler Companies Inc., St. Charles, Ill. (Apr. 1992).
"Safety Accessories," 1 page brochure, Eastern Metal of Elmira, Inc., Elmira, N.Y. (Oct. 1983).
"Warning Lights," 1 page brochure, Eastern Metal of Elmira, Inc., Elmira, N.Y. (Oct. 1983).

Primary Examiner—John K. Peng
Assistant Examiner—Benjamin C. Lee
Attorney, Agent, or Firm—Fitch, Even, Tabin & Flannery

[57] ABSTRACT

A warning device includes a flexible collar of adjustable length so as to be wrapped about a beam, pole or log being transported on a vehicular carrier. The flexible collar includes a serial connection of a rigid mounting base, a tensioning device and a chain. A light fixture, warning flags or other devices can be supported by the rigid mounting base. The flexible collar also includes rigid arms hingedly connected to the mounting base, and preferably shaped in the form of a yoke.

14 Claims, 9 Drawing Sheets

LOAD EXTENSION SIGNALING DEVICE

BACKGROUND OF THE INVENTION

1. Field of the Invention

The present invention pertains to warning lights and their mounting, and particularly to such lights for use with vehicle-carried loads.

2. Description of the Related Art

Vehicles on controlled roadways, especially federally controlled highways, must provide proper indication of their presence to other motorists. In passenger vehicles, such illumination is often integrated with the vehicle body. However, such arrangements are frequently impractical or impossible. For example, structural beams, logs and utility poles, for example, may be supported at their midsection with a rearward extending overhang. At times, these and other similar loads are supported in the front by a towing vehicle and in the rear by a wheeled dolly, but again with a rearward overhang.

The overhanging loads must oftentimes be marked at their rearwardmost extremity to adequately warn motorists following the load. However, no vehicle body is present at that location to carry the warning devices. Various arrangements have been proposed for these types of loads. For example, U.S. Pat. No. 1,893,303 includes a fixture resembling a C-clamp for attaching a warning light to tubular pipe. U.S. Pat. No. 1,535,844 employs a hanging chain cinched about a single member of a load to carry a warning display. U.S. Pat. No. 3,041,580 provides a retractable electrical cord extending from the vehicle to the end of the load being carried. A spring loaded drum for retracting the electrical wire is mounted on the vehicle.

Specially configured arrangements have been proposed for attachment to a particular, oftentimes uniquely shaped, portion of a vehicle. Examples are found in United States Letters Patent Nos. 2,975,401; 3,080,581; 5,088,439; and 5,134,385.

Also, arrangements have been proposed for particular loads, such as utility poles. A pole light is commercially available from Work Area Protection Corporation in St. Charles, Ill., and provides a rigid metal plate with downwardly extending pins which engage the upper surface of a utility pole. A chain encircling the girth of the pole secures the plate in place. The plate provides mounting for a battery operated warning light. Eastern Metal of Elmira, Inc., located in Elmira, N.Y., provides a pole transport light clamp No. LC-210, configured with a downwardly opening, C-shaped channel, the bottom edges of which are serrated with a sawtooth pattern. A spring loaded chain is secured to the C-channel and encircles the girth of the pole. A lever operated hook secures the ends of the chain to form a closed loop. A battery operated warning light, such as those typically found on traffic barricades, can be mounted atop the C-channel in combination with warning flags.

Despite the efforts by others indicated above, a need still exists for an improved indicating device to provide warning of an extended lead being carried by a vehicle on a public roadway.

SUMMARY OF THE INVENTION

It is an object of the present invention to provide an improved mounting base for warning lights, warning flags and other indicating devices, and for attaching those devices to a lead comprising one or more elongated objects.

Another object according to principles of the present invention is to provide a mounting device for attachment to a lead comprising one or more elongated objects, and having a flexible collar of adjustable length so as to take up a significant amount of slack, providing a secure attachment to the lead.

These and other objects according to principles of the present invention are provided in a warning device for releasable attachment to the outer surface of an object, comprising:

a flexible collar of adjustable length comprising a serial succession of elements coupled end-to-end to form a flexible band of adjustable length, the elements including a rigid mounting base for mounting a light fixture extending away therefrom, a lever operated clamp including a hook, articulated linkage connected directly to the mounting base, and a chain having links adapted to receive the hook;

a light fixture; and means for mounting the light fixture to the flexible collar.

DETAILED DESCRIPTION OF THE PREFERRED EMBODIMENTS

Referring now to the drawings, and initially to FIGS. 1–3 and 6, indicator device is generally shown at 10. Indicator device 10 includes a mounting arrangement generally indicated at 12 and a light fixture generally indicated at 14. The indicator device 10 is shown mounted immediately adjacent the butt end of a pole 16 so as to affix the lighting fixture 14 in a prominent position for display.

Figure 1:
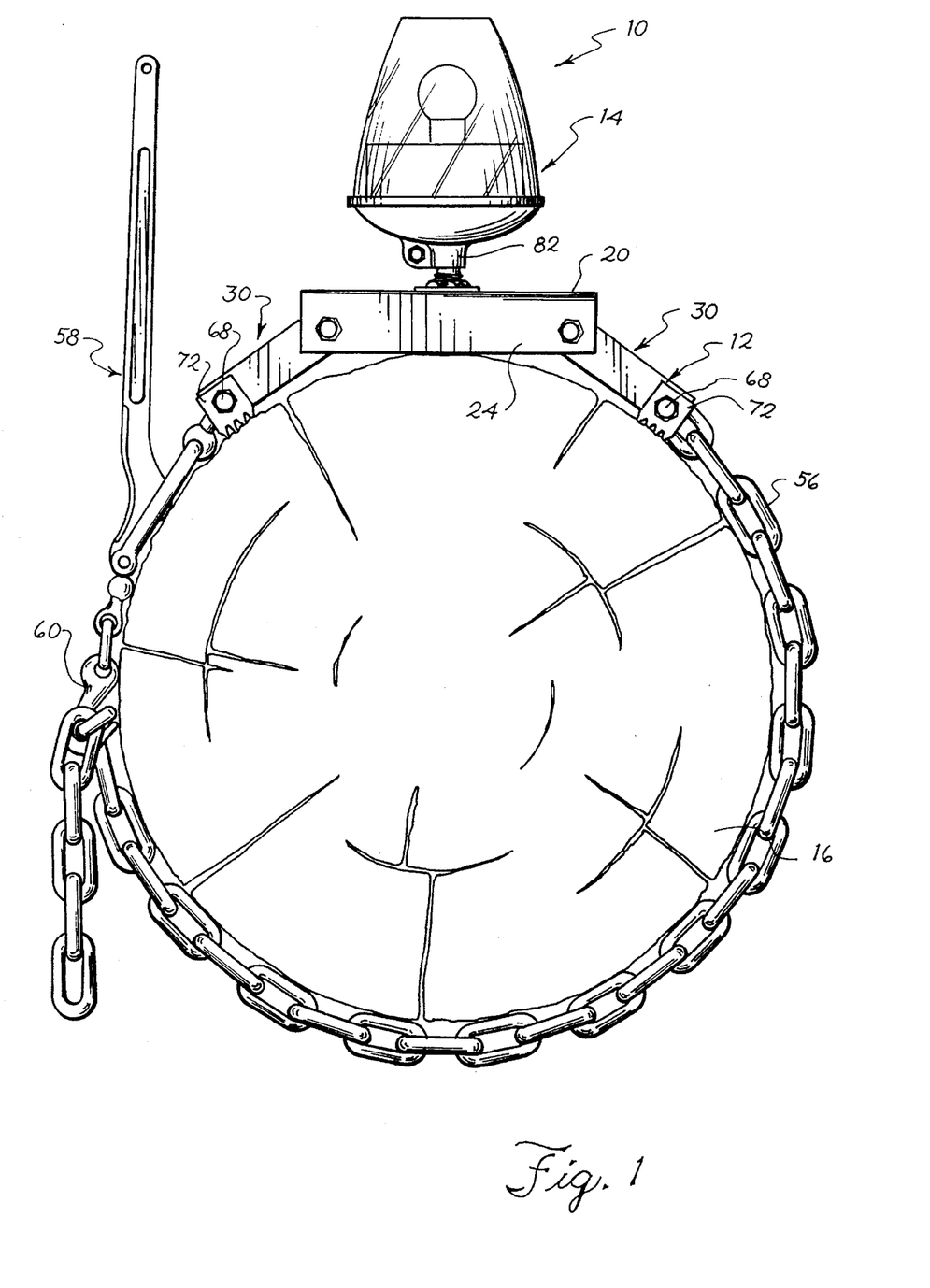
FIG. 1 is a front view of a warning device illustrating principles according to the present invention, shown secured to a load.
Figure 6:
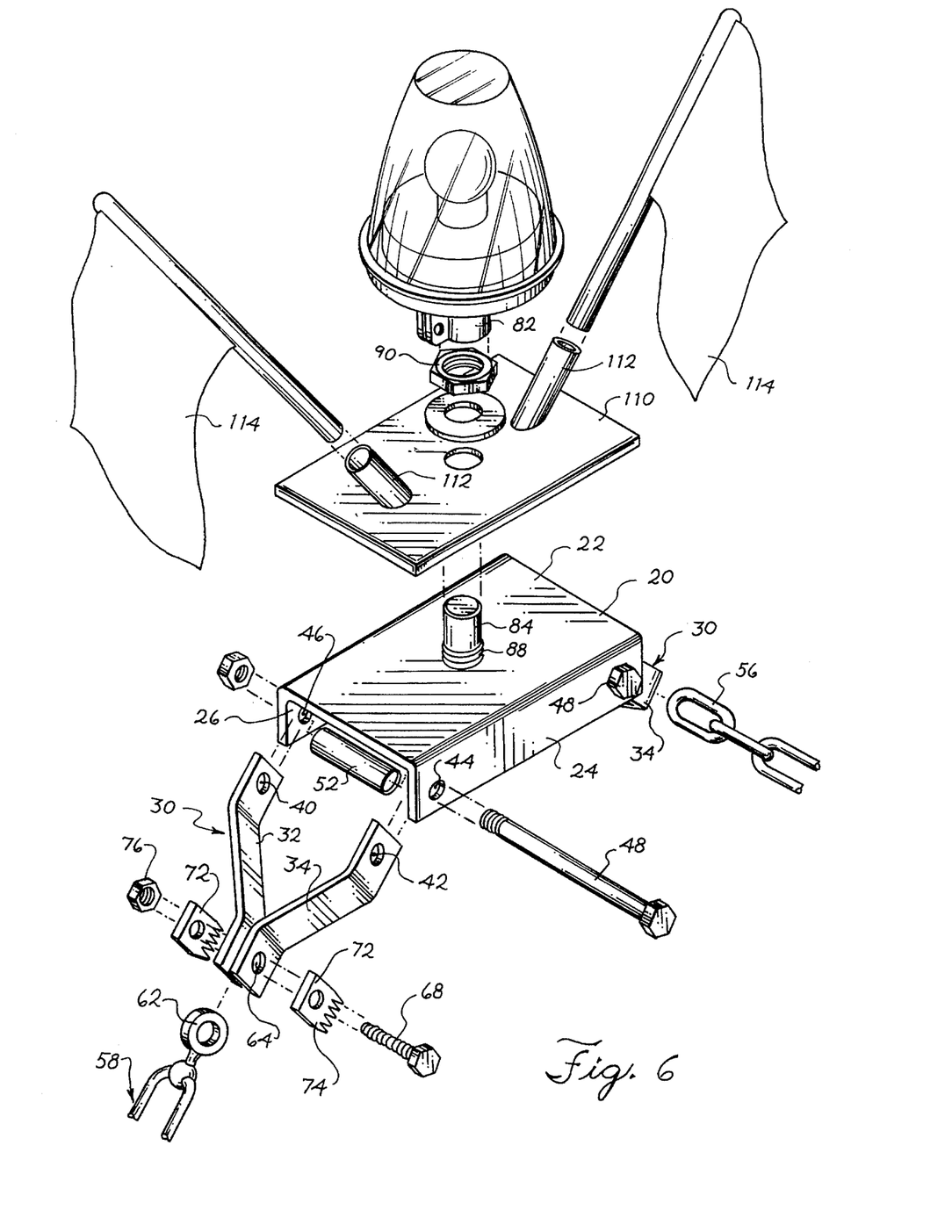
FIG. 6 is an exploded perspective view of the device of FIGS. 1–3.

Mounting arrangement 12 includes a support base 20 which, as can be seen in FIG. 6, for example, comprises a C-channel with a central web 22 and flanges 24, 26 extending downwardly therefrom. As indicated in FIG. 1, for example, the axis of channel 20 is positioned at an angle, preferably a right angle to the axis of pole 16. At each end of channel 20 a yoke 30 is provided, comprising a pair of rigid linkage arms 32, 34. The arms 32, 34 are bent in an S-shaped configuration so as to have a wider spacing adjacent channel 22 and so as to have a closer spacing, preferably touching one another at a point remote from channel 22.

Referring again to FIG. 6, apertures 40, 42 are formed in the arms 32, 34 so as to be aligned in registry with apertures 44, 46 formed in flanges 24, 26. A threaded member or screw 48 is inserted through the apertures to provide pivoting attachment of yoke 30 to channel 20. The tubular sleeve is inserted between the apertures 40, 42 so as to receive screw 48 while maintaining the ends of arms 32, 34 at a desired spacing.

The mounting arrangement 12 further includes a chain 56 secured to one yoke 30, in a manner to be described. A lever operated lock or chain binder 58 is secured to the other yoke 30 and includes a hook member 60 coupled to a length of chain 56. Referring again to FIG. 6, binder 58 includes a connecting ring 62 which is aligned with apertures 64 at the remote ends of arms 32, 34. A threaded fastener or screw 68 secures ring 62 to the arms 32, 34 and also provides convenient mounting for gripping members 72 having teeth 74. A nut 76 secures the remote end of the yoke (i.e., remote from channel 20) together, while providing pivotal attachment for ring 62 to the yoke. The other yoke 30, illustrated in FIG. 6, is attached to the end link of chain 56 which is received between the remote ends of arms 32, 34, all of which receive a screw fastener 68. Preferably, gripping members 72 are provided on both yokes, as illustrated in FIG. 1.

Figures 2, 3:
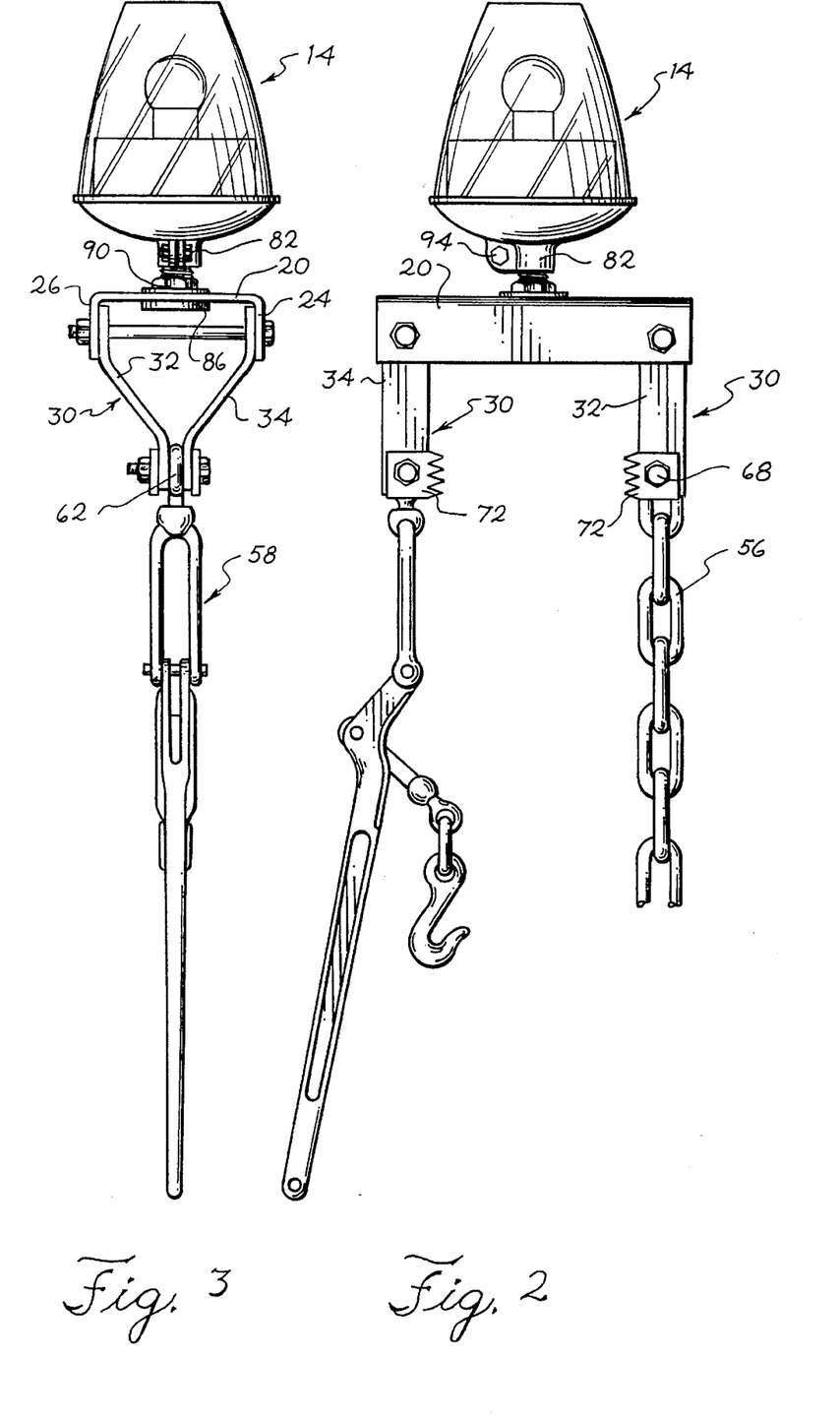
FIG. 2 is a fragmentary view similar to that of FIG. 1, showing the device prior to installation.
FIG. 3 is an end view thereof.

Referring to FIGS. 1–3, the light fixture 14 has a split collar base 82 which receives the upper end of a mounting fastener 84. Mounting fastener 84 has an enlarged head 86, visible in FIG. 3, and a threaded portion 88, visible in FIG. 3 and other Figures. A nut fastener 90 secures fastener 84 to channel 20. The base 82 of lamp fixture 14 is then inserted on the upper end of mounting pin 84, with the split collar being tightened by a screw fastener 94 (see FIG. 2).

In use, channel 20 is positioned on the outside surface of pole 16, in the manner illustrated in FIG. 1, with channels flanges 24, 26 engaging the pole surface. The yokes 30 are then lowered so that the gripping members 72 engage the outer surface of pole 16, and chain 56 is wrapped around the girth of pole 16 and secured to hook 60. The handle of binder 58 is then moved to the position illustrated in FIG. 1 to remove slack and tension the mounting arrangement 12.

As will now be appreciated, the mounting fixture 12 in effect serves as a flexible collar wrapped in a closed loop about the girth of pole 16. In the preferred embodiment, the various parts of mounting arrangement 12 are connected end-to-end in a serial array. If desired, parts of the mounting arrangement can be arranged side-by-side, and can even be duplicated, if desired. For example, a second chain can be secured to the left-hand yoke 30, shown in FIG. 1, and can be wrapped about the girth of pole 16, being secured to the pole by a second binder connected to the right-hand yoke 30, thus providing dual chain securement to the pole.

Considerable tension forces can be generated with the preferred embodiment as described. The rigid arms forming yokes 30 have been found to provide an important advantage in aligning the tensile forces to minimize potential energy stored in the chain and binder. Yoke 30 is preferably formed so that tensile forces imparted to channel 20 (by either the binder or chain, depending on which end of the channel is being considered) are oriented generally along the centerline of channel 20. This helps align the chain and binder along a minimum path length about the girth of pole 16, preventing components of the mounting fixture from wandering to one side or another along a path of increased length, which could result in stored potential energy which could be released when the indicator device is shifted along the length of pole 16, thus introducing slack into the mounting arrangement. The rigid arms 32, 34 of yoke 30 provide an articulated, swinging movement, conforming at least somewhat to the outer surface of the load, while locating the gripping members 72 at points spaced from channel 20. In effect, the yokes 30 and channel 20 function as three interconnected links. This conformance and increased spacing increases the stability of channel 20 positioning about pole 16.

As can be seen in FIG. 6, for example, the arms 32, 34 (as well as other components of the mounting fixture) are preferably formed from flat stock, preferably a metal stock such as mild steel, hardened steel or any of a variety of stainless steels or other alloys, for example. The cross section of arms 32, 34 is elongated and preferably rectangular, thus presenting a flat surface (preferably substantially perpendicular to the outside surface of the load) for mating with the gripping members 72 which have complementary flat mating surfaces. Arms 32, 34 help to orient gripping members 72 parallel to the channel flanges 24, 26 and prevent twisting of the gripping members out of parallel alignment. This enhances the stability of the gripping members with regard to load shifting movements directed generally along the length of pole 16. The gripping members 72 are, of course, spaced apart by the width of arms 32, 34 and the width of ring 62, further increasing the stability of the gripping members. As indicated in FIG. 3, however, the spacing of the gripping members is still substantially less than the spacing between flanges 24, 26. Other applications of the indicator device may allow yoke 30 to have more uniform spacings at its opposed ends; however, the illustrated arrangement with reduced yoke spacing at points remote from channel 20 has been found preferable for securing light fixtures, flags and other indicating devices on wooden poles.

Figure 4:
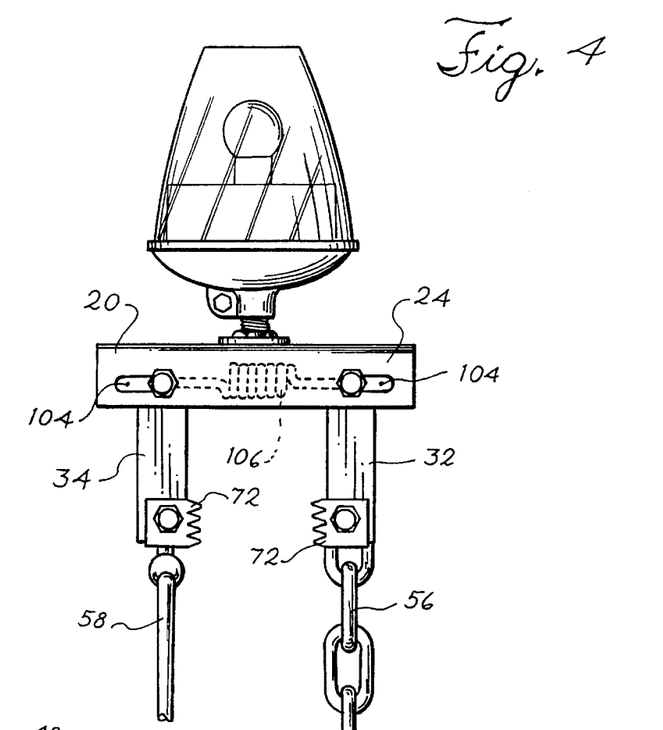
FIG. 4 is a front view of an alternative embodiment thereof.
Figure 5:
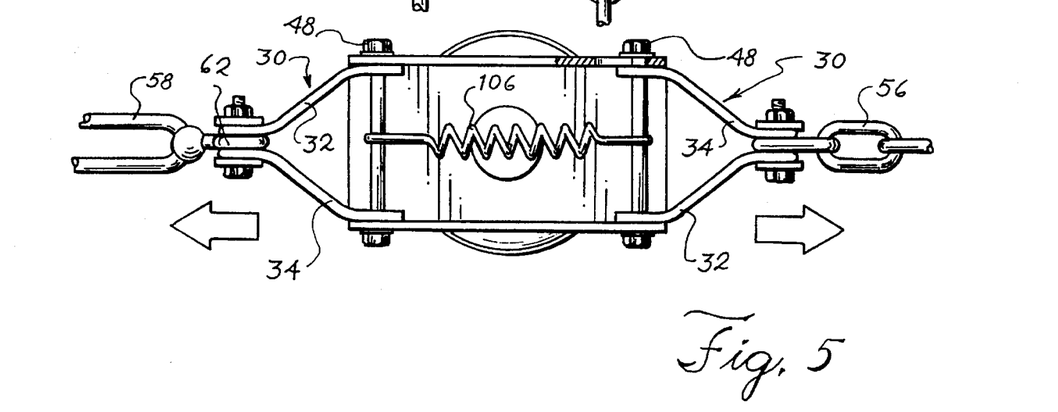
FIG. 5 is a bottom plan view thereof.

FIGS. 4 and 5 show an alternative embodiment where the aforementioned apertures 44, 46 are replaced by elongated slots 104. The screw fasteners 48 are biased toward one another by coil spring 106. The coil spring 106 provides a tensioning force in chain 56, and, if desired, can be made suitably strong so as to allow the elimination of binder 58, with both ends of chain 56 being either directly connected or indirectly coupled to the yokes of the mounting arrangement. It may be preferable in this instance to replace the binder 58 with a hook member to allow coarse adjustment of chain 56 with spring 106 taking up the minor adjustment in chain slack. While a single coil spring is shown in the embodiments of FIGS. 4 and 5, it will be appreciated that multiple springs may be employed and that the springs may not be of a helical or coil configuration. As can be seen in FIGS. 4 and 5, the channel 20 provides a protective housing for the spring members, avoiding inadvertent contact with the moving parts. The locations of screw fasteners 48 in slots 104 provide a ready visual indication of the tensioning of the chain.

FIG. 6 shows an alternative embodiment wherein a mounting plate 110 is interposed between nut fastener 190 and channel 20. Mounting plate 110 includes sockets 112 to receive flag indicators 114. Mounting plate 110 can be dimensioned larger, if desired, and can mount devices other than light fixtures and indicating flags.

Figure 7:
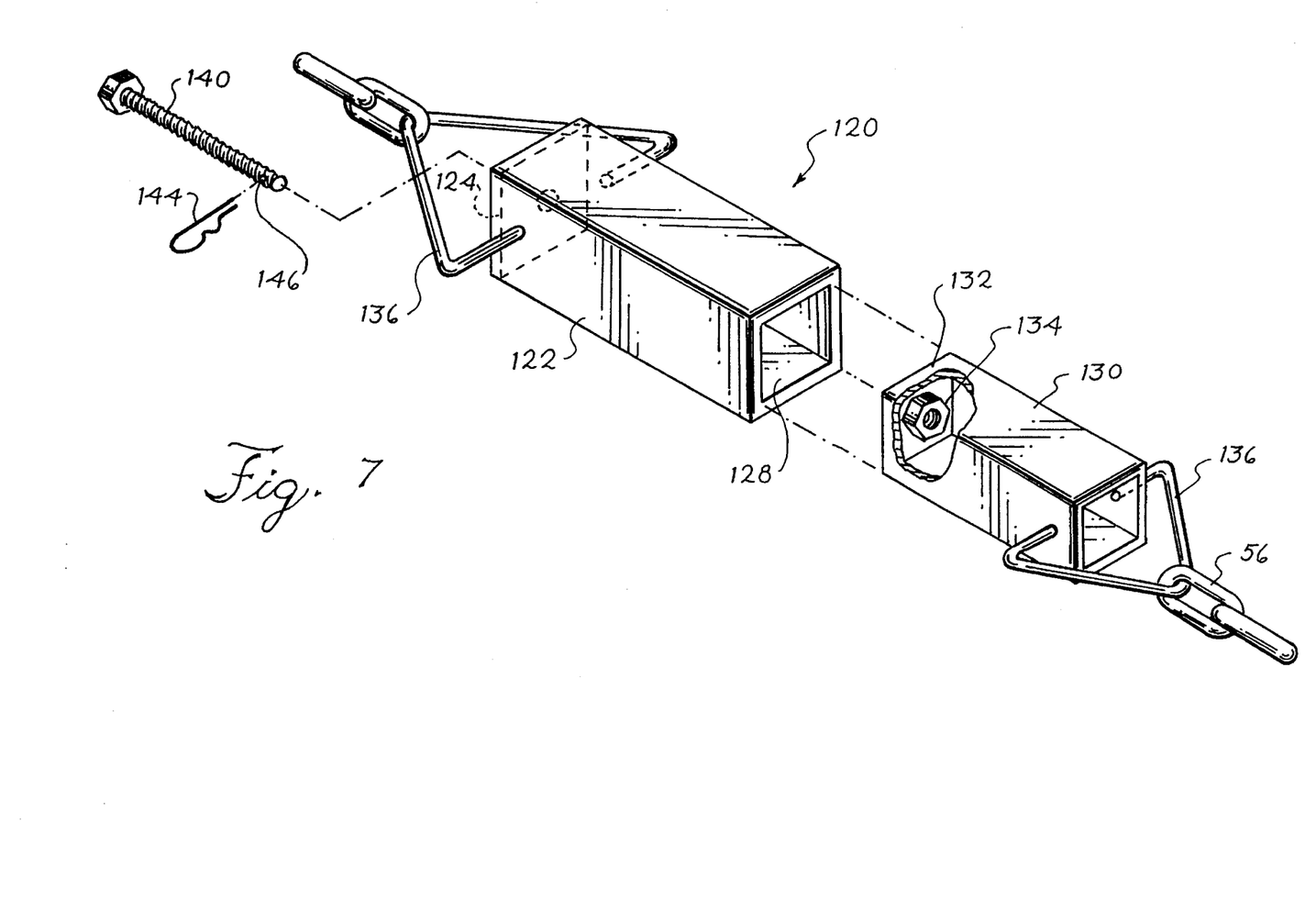
FIG. 7 is an exploded perspective view of a tensioning device according to the present invention.

Referring now to FIG, 7, an alternative embodiment of a chain tensioning device is generally indicated at 120. The chain tensioner 120 includes a first tubular housing 122 having an end wall 124 with an aperture 126, and an opposite open end 128. A second tubular housing member 130 has a slightly smaller cross section than that of member 122. The housing member 130 has a closed end 132 with a nut fastener 134. At the opposite end of housing member 130, an attachment means, preferably in the form of a bale 136 is provided for attachment to chain 56. A similar bale 136 is also attached to the first housing member 122 for securement to a chain member, or other component of the mounting fixture. When used with the indicator device 10, bale 136 provides convenient attachment to yoke 30. A smaller housing member 130 is inserted in housing member 122 for a sliding, telescopic fit. A screw fastener 140 is inserted through fastener 126 and threadingly engages nut 134, with the head of screw 140 seating against wall 124. When threadingly engaged with nut 134, screw 140 is advanced to expose its free end located opposite the head. A keeper pin 144 is inserted within a cross hole 146 to prevent screw 140 from becoming disconnected. As screw 140 is tightened, nut 134, and hence housing member 130, is drawn toward end wall 124, thus increasing tension to the bales 136. The screw 140 provides a high degree of control in the tension of mounting arrangement 12 when used to replace the binder 48.

Figures 8, 9:
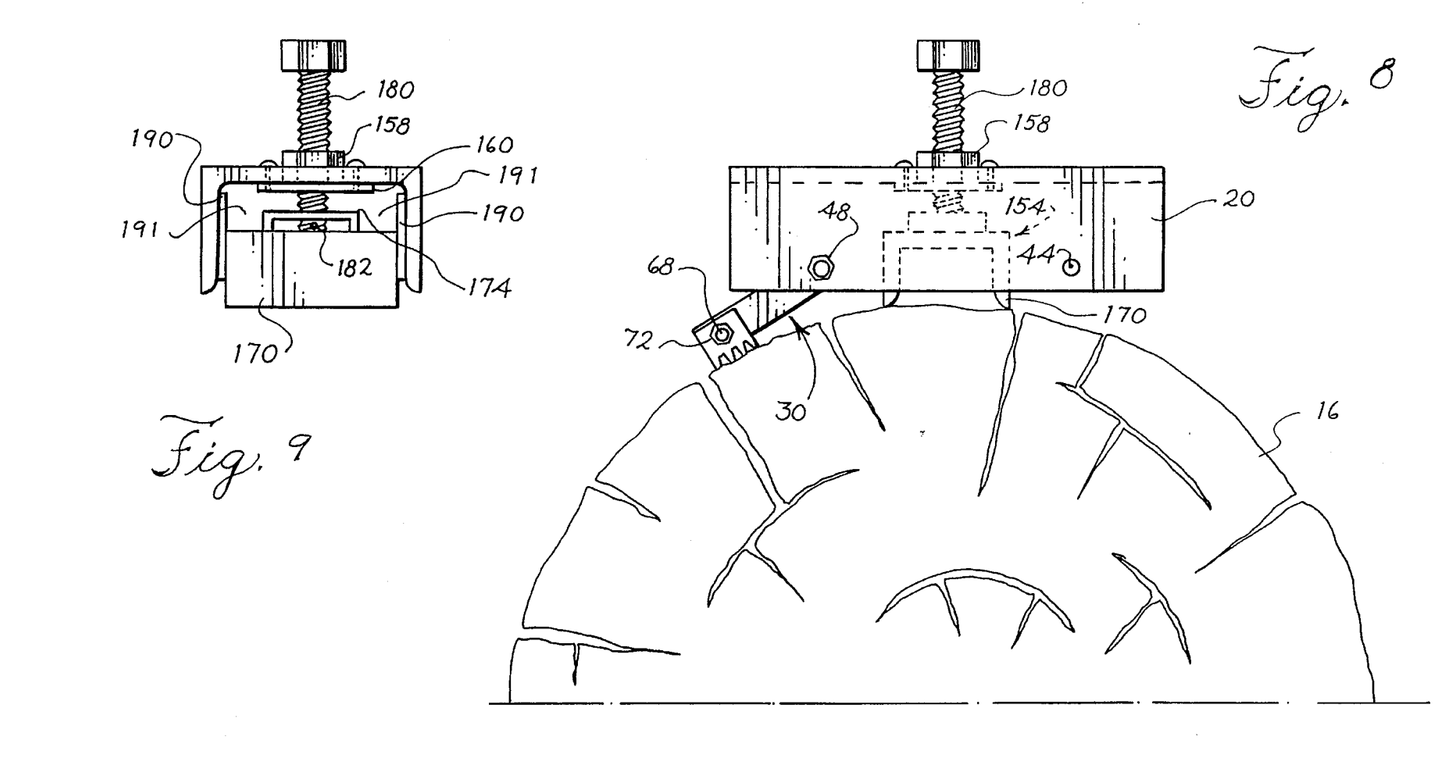
FIG. 8 is a front view of an alternative embodiment of a mounting device according to principles of the present invention.
FIG. 9 is an end view thereof.
Figure 10:
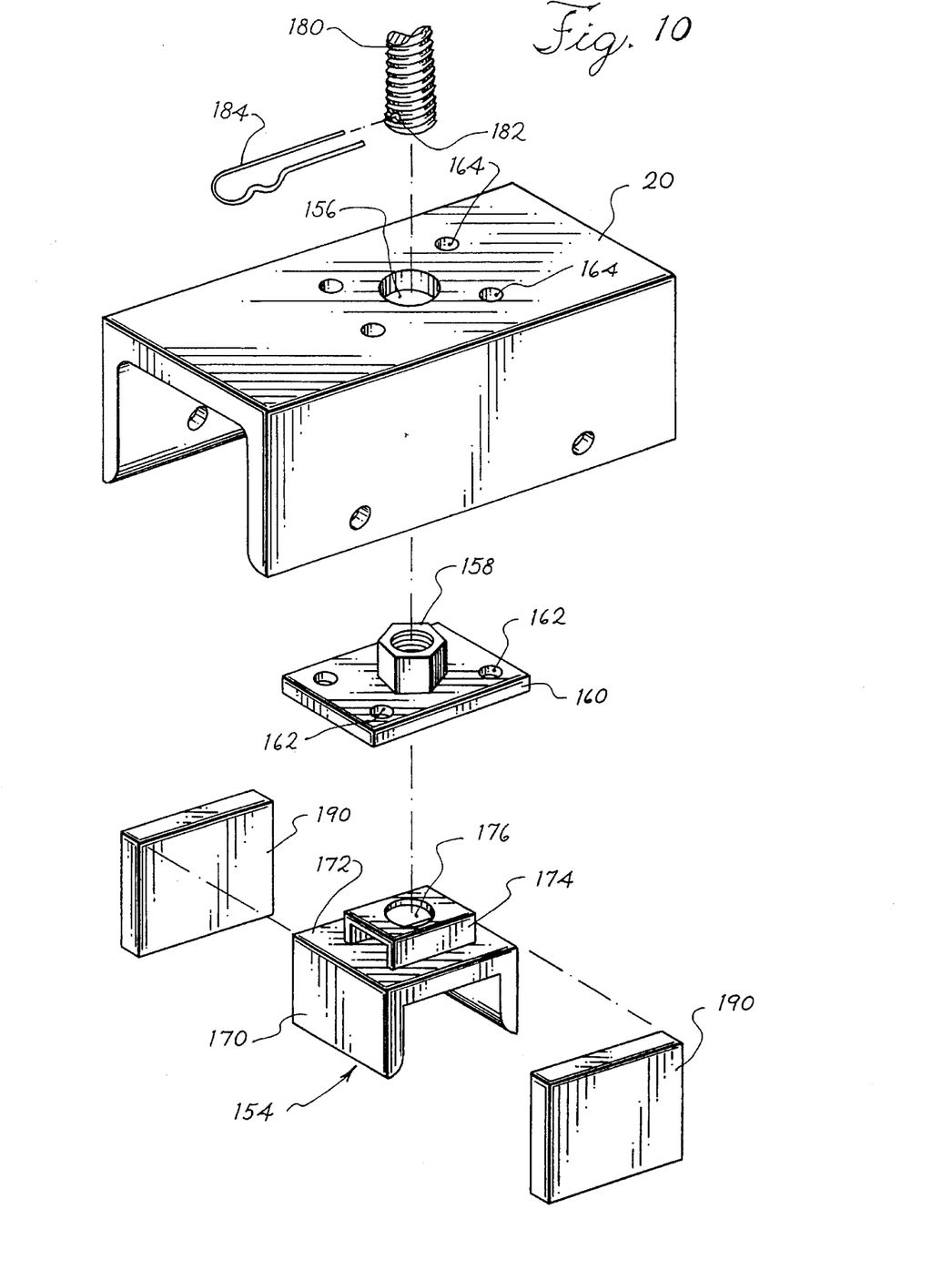
FIG. 10 is a partial exploded perspective view thereof.

Referring now to FIG. 8, an alternative embodiment of a support base is generally indicated at 150. As will be seen, support base 150 replaces channel 20 and binder 58 of mounting arrangement 12 illustrated in FIGS. 1–3. Mounting base 150 includes a C-shaped channel, similar to that illustrated above, having apertures 44 for receiving screw fasteners 48. Yokes 30 are secured to the screw fasteners 48, in the manner described above. A slide member 154 is inserted within channel 20 and is aligned in registry with an aperture 156 drilled in the central web of channel 20, as can be seen in FIG. 10. A nut fastener 158 welded to a mounting plate 160 is inserted within channel 20, and nut 158 is inserted through aperture 156. Mounting screws are received in apertures 162 in plate 160 and in apertures 164 formed in channel 20 to secure the nut fastener 158 in place in the manner indicated. Slide member 154 includes a C-shaped channel or tip 170 preferably having a solid, unbroken central web 172.

A shorter C-shaped channel 174 is welded at its bottom edges to web 172. C-shaped channel 174 has a central aperture 176 to receive the bottom free end of a screw fastener 180. A cross hole 182 formed in screw fastener 180 receives a locking pin 184 which is held captive between C-shaped channel 174 and tip 170, thus preventing disengagement of screw fastener 180 from the slide member 154, in operation. As screw fastener 180 is threadingly advanced in nut fastener 158, slide member 154 is driven toward and away from the central web of C-shaped channel 20. In a preferred mode of operation, support base 150 replaces C-shaped channel 20 and chain binder 58 so as to provide tension adjustment for the mounting arrangement. As screw fastener 180 is advanced toward pole 16, the tip 170 of slide fastener 154 is pressed against the outer surface of the pole, drawing channel 20, and hence the chain member 56 secured to yokes 30, away from the pole, increasing tension in the chain. If desired, the bottom edges of tip 70 can be serrated, although this has not been found to be necessary.

Referring again to FIG. 10, plates 190 are used in the preferred embodiment to increase stability of slide member 154 within channel 20. As shown in FIG. 9, the majority of plates 190 are positioned above the top surface of tip 170. In the preferred embodiment, plates 190 are positioned for a close spaced relationship with the flanges of channel 20. Plates 190 also cooperate with C-shaped channel 174 to provide a pair of recesses 191 for electrical wiring which is protected against pinching when the slide member 154 is fully retracted toward channel 20. The plates 190 are positioned so as to prevent channel 174 from "bottoming out" against plate 160.

Figure 11:
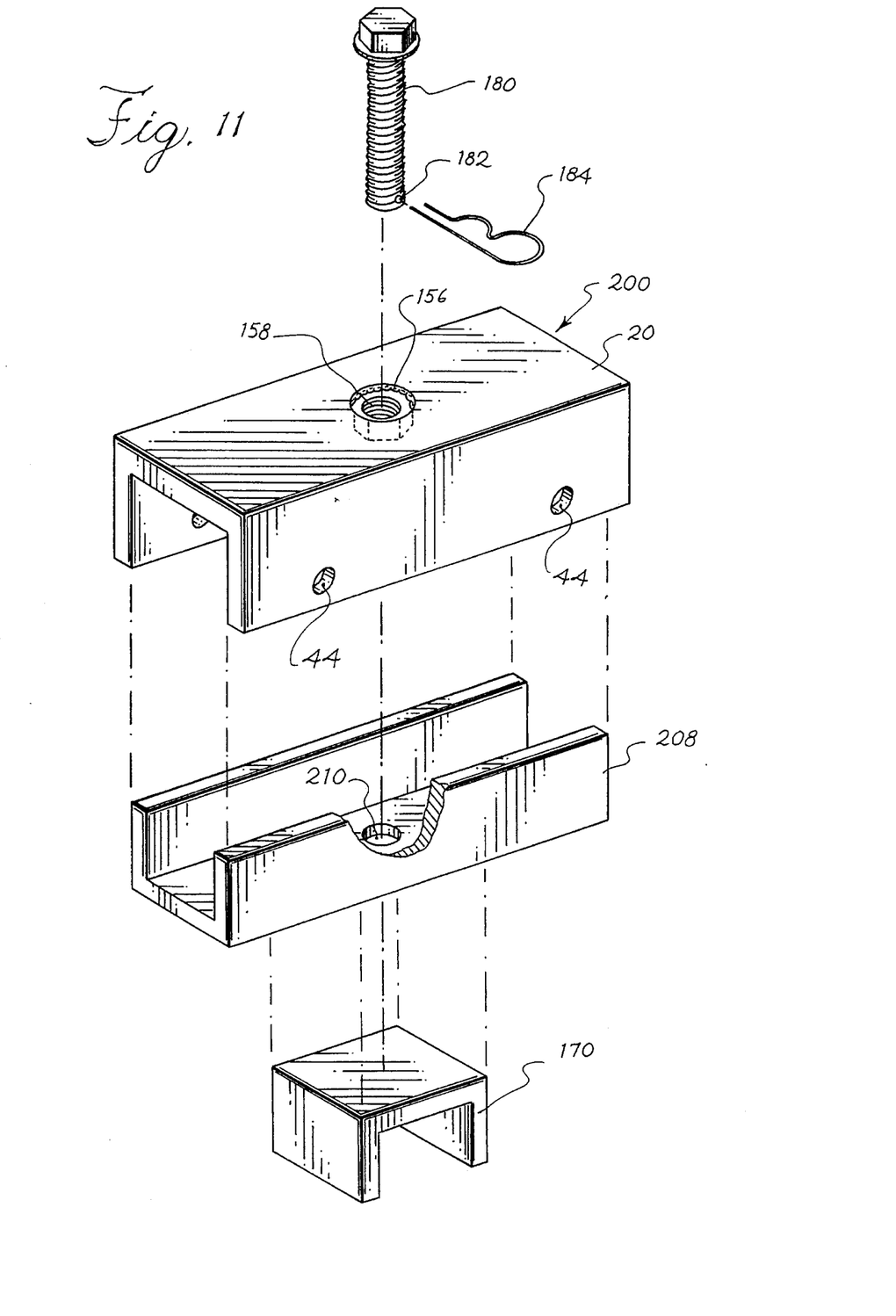
FIG. 11 is an exploded perspective view of an alternative embodiment of a mounting device according to principles of the present invention.
Figure 12:
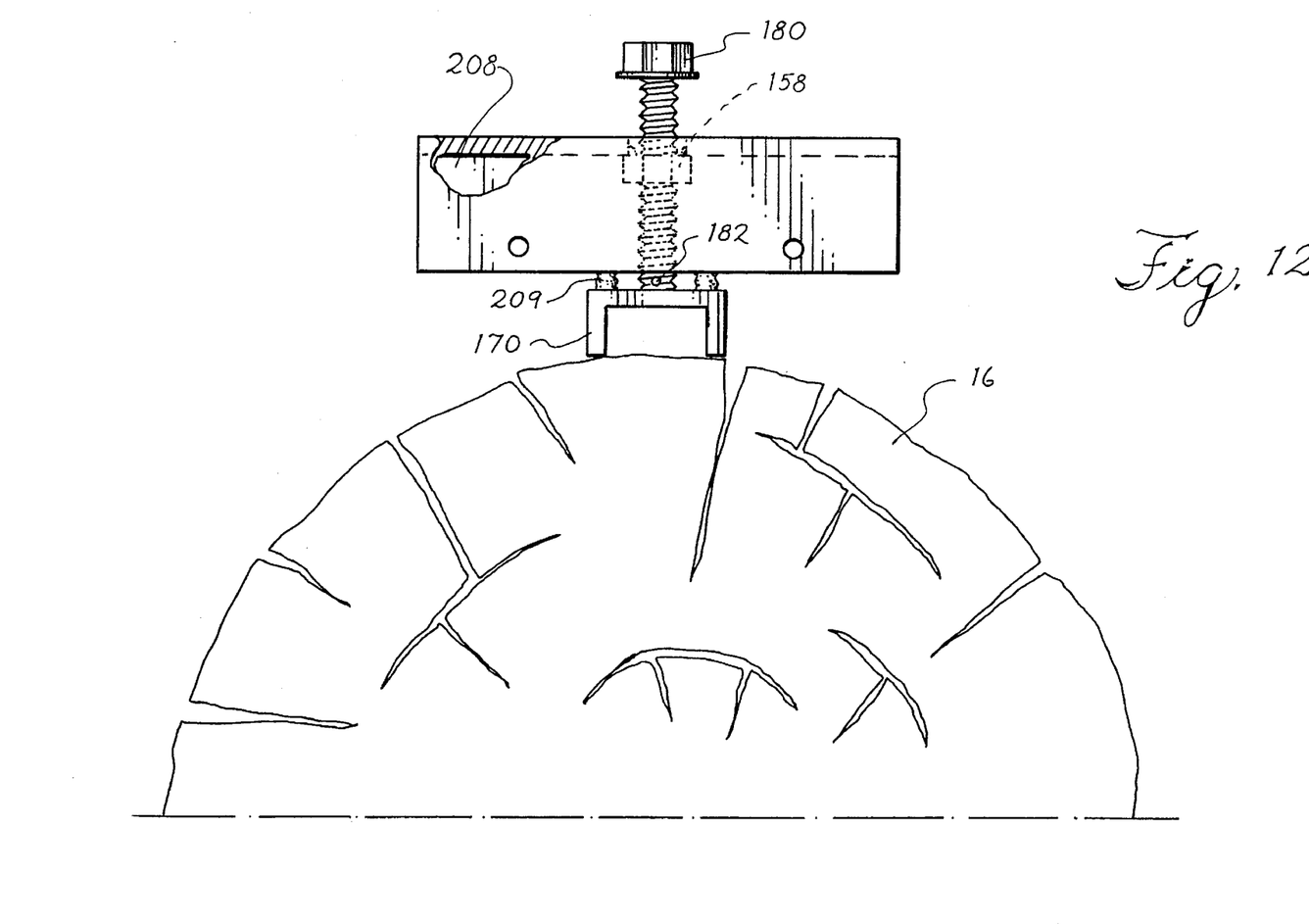
FIG. 12 is a partial front view thereof.

Referring now to FIGS. 11 and 12, an alternative embodiment of the mounting base is generally indicated at 200. Mounting base 200 is similar in construction to the aforedescribed mounting base 150, except for differences which will be discussed here. For example, the nut 158 is mounted beneath the central web of channel 20, and is welded thereto in registry with aperture 156. The tip 170 is substantially identical to that described in FIG. 10, except that the C-shaped channel 174 is replaced by a relatively longer upwardly opening C-shaped channel 208. An aperture 210 receives the bottom end of screw fastener 180. As shown in FIG. 12, channel 208 is spaced from a tip member 170, preferably by forming a weld bead between the two members, so as to form a gap 209 within which keeper pin 184 can be inserted through cross hole 182. Operation of mounting base 200 is substantially the same as for mounting base 150.

As will now be seen, the present invention provides a flexible collar comprising a serial succession of elements coupled together so as to conform to the outer surface of a utility pole or similarly shaped object. As is known in the art, utility poles are typically formed by trimming and debarking specially grown trees. For reasons of economy, it is preferred that a minimum amount of material be removed from a tree in providing a finished utility pole. As a consequence, utility poles typically have a base of larger girth and a top end of considerably smaller girth. The girth is usually characterized by a predefined "class". Utility poles are typically provided in varying lengths, and this will also have an effect on the difference between top and bottom ends of the poles. While it is generally desirable that the poles have a smooth outer surface with a tapered cylindrical "or frustoconical" configuration, it is not always possible in commercial manufacturing operations to ensure a circular cross section at every point along the length of the pole. This is particularly noticeable at the base or the upper end of the pole where the cut face of the pole is exposed. Typically, the cut faces reveal a pole cross section which is oblate, and which may have flat spots resulting from growth characteristics of the tree selected. The warning device of the present invention has been found to provide ready conformation and secure slip-free engagement with utility poles having a wide variety of outer perimeters and outer surface configurations.

As has been discussed, the collar of the warning device is formed by a serial succession of interconnected elements, coupled end-to-end to form a flexible band of adjustable length. The elements include a lever-operated clamp or other tensioning device, preferably with a hook, articulated linkage, (and preferably including three links pinned together) with the middle link comprising a platform for mounting a light or other device. The final preferred element in the collar comprises a length of chain coupled to one end of the articulated linkage. The hook of the lever operated clamp engages links of the chain to provide an adjustable length. The end links of the articulated linkage preferably include gripper teeth (pointing away from the middle link). In the embodiment described, a pin is secured to the middle link and a lamp is secured to the pin with a split metal collar. Thus, the light fixture can be quickly and easily removed from the middle link. In this manner, the light fixture can remain out of harm's way while the relatively heavy, rugged collar is attached to a pole. The light fixture is slipped onto the mounting pin after the collar is attached.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. An adjustable mounting device for a signal which device releasably attaches to the outer surface of an elongated object having a longitudinal axis, the mounting device comprising:

a rigid mount base having at least two opposed flanges extending downward therefrom, the flanges adapted to engage the surface of the elongated object;

at least two rigid arms, each arm having a pivotal coupling with the mounting base, each arm including gripping teeth spaced from the pivotal coupling, the teeth adapted to engage the surface of the elongated object as the arms are swingingly pivoted toward the surface of the object;

a chain adapted to wrap around the surface of the object and interconnect the arms when the signal is mounted onto the object and the chain is wrapped around the surface of the object; and a tensioning device to pull the flanges into the surface of the object and pivotally engage the teeth into the surface of the object to releasably anchor the signal to the object.

2. An adjustable device as recited in claim 1, wherein the downwardly extending flanges are in planes generally parallel to planes formed by the gripping teeth, the planes being generally perpendicular to the longitudinal axis of the object.

3. An adjustable mounting device as recited in claim 2 wherein the arms are at opposite sides of the mount base, each opposing arm having two parallel sections pivotally engaged with the base, the parallel sections forming a yoke adapted to be attached to the chain.

4. The adjustable mounting device as recited in claim 3 wherein the tensioning device includes outer and inner telescopically interfitting tubes, an end wall defining an aperture and enclosing one end of the outer tube, and a threaded fastener passing through the aperture, threadingly engaging the inner tube, said fastener having a head portion engaging the end wall of the outer tube.

5. An adjustable device as recited in claim 1, wherein the downwardly extending flanges are in planes generally perpendicular to planes formed by the gripping teeth, the downwardly extending flanges in planes generally parallel to the longitudinal axis of the elongated object.

6. An adjustable mounting device as recited in claim 5 wherein the arms are at opposite sides of the mount base, each opposing arm having two parallel sections pivotally engaged with the base, the parallel sections forming a yoke adapted to be attached to the chain.

7. An adjustable mounting device as recited in claim 6 wherein each parallel section of the opposing arms include said gripping teeth.

8. The adjustable mounting device as recited in claim 6 wherein the tensioning device includes outer and inner telescopically interfitting tubes, an end wall defining an aperture and enclosing one end of the outer tube, and a threaded fastener passing through the aperture, threadingly engaging the inner tube, said fastener having a head portion engaging the end wall of the outer tube.

9. An adjustable mounting device as recited in claim 1 wherein the arms are at opposite sides of the mount base, each opposing arm having two parallel sections pivotally engaged with the base, the parallel sections forming a yoke adapted to be attached to the chain.

10. An adjustable mounting device as recited in claim 9 wherein each parallel section of the opposing arms include said gripping teeth.

11. The adjustable mounting device as recited in claim 10 wherein the tensioning device includes outer and inner telescopically interfitting tubes, an end wall defining an aperture and enclosing one end of the outer tube, and a threaded fastener passing through the aperture, threadingly engaging the inner tube, said fastener having a head portion engaging the end wall of the outer tube.

12. The device of claim 1 wherein the tensioning device includes a hook adapted to receive links of the chain.

13. The device of claim 1 wherein the tensioning device includes outer and inner telescopically interfitting tubes, an end wall defining an aperture and enclosing one end of the outer tube, and a threaded fastener passing through the aperture threadingly engaging the inner tube, said fastener having a head portion engaging the end wall of the outer tube.

14. The device of claim 1 wherein the tensioning device comprises a slide member guided by the mount base for movement toward and away from the mount base, a threaded fastener threadingly engaged with the mount base and having a free end engaging the slide member to press the slide member against the object for creating tension in the collar when pressing the slide member displaces the mount base away from the object.

* * * * *